US006824918B2

United States Patent
Kim (10) Patent No.: US 6,824,918 B2
(45) Date of Patent: Nov. 30, 2004

(54) BATTERY PACK HAVING INTERNAL BATTERIES HAVING EQUALIZED CURRENT CHARACTERISTICS

(75) Inventor: Jong-Sam Kim, Asan (KR)

(73) Assignee: Samsung SDI Co., Ltd., Suwon-si (KR)

(*) Notice: Subject to any disclaimer, the term of this patent is extended or adjusted under 35 U.S.C. 154(b) by 280 days.

(21) Appl. No.: 10/141,082

(22) Filed: May 9, 2002

(65) Prior Publication Data

US 2003/0003353 A1 Jan. 2, 2003

(30) Foreign Application Priority Data

Jun. 13, 2001 (KR) .......................................... 2001-33241

(51) Int. Cl.[7] .............................. H01M 2/22; H02J 7/00
(52) U.S. Cl. ....................... 429/158; 320/116; 320/118; 320/120
(58) Field of Search ................................. 429/158–159; 320/116–122; 439/500

(56) References Cited

U.S. PATENT DOCUMENTS 5,811,959 A * 9/1998 Kejha ......................... 320/126

* cited by examiner

Primary Examiner—Gregg Cantelmo
(74) Attorney, Agent, or Firm—Robert E. Bushnell, Esq.

(57) ABSTRACT

In a battery pack, first through $n^{th}$ secondary batteries, where n is an integer of 2 or more, are sequentially stacked from the pack output terminals. $(n+2)^{th}$ and $(n+1)^{th}$ secondary batteries are disposed from positions of pack output terminals in a row in a direction perpendicular to a direction the first through $n^{th}$ secondary batteries are arranged. First polarity terminals of $(n+2)^{th}$ and $(n+1)^{th}$ secondary batteries are connected to each other. A pack output terminal having a second polarity opposite to the first polarity and the second polarity terminals of $n^{th}$, $(n+1)^{th}$, and $(n+2)^{th}$ are connected in common by a conductive body. The second polarity terminals of $(n+2)^{th}$ and $(n+1)^{th}$ secondary batteries are connected to each other by a first conductive body. A second conductive body is connected to the pack output terminals having the second polarity connected at a first branch point of the first conductive body.

25 Claims, 6 Drawing Sheets

BATTERY PACK HAVING INTERNAL BATTERIES HAVING EQUALIZED CURRENT CHARACTERISTICS

CLAIM OF PRIORITY

This application makes reference to, incorporates the same herein, and claims all benefits accruing under 35 U.S.C. §119 from an application for BATTERY-PACK WHERE CURRENT CHARACTERISTICS OF INTERNAL BATTERIES ARE EQUALIZED earlier filed in the Korean Industrial Property Office on Jun. 13, 2001 and there duly assigned Ser. No. 2001-33241.

BACKGROUND OF THE INVENTION

1. Field of the Invention

The present invention relates to a battery pack, and more particularly, to a battery pack included in a battery, for example, a smart battery, used in a portable electronic apparatus such as a notebook computer.

2. Description of the Related Art

Figure 1:
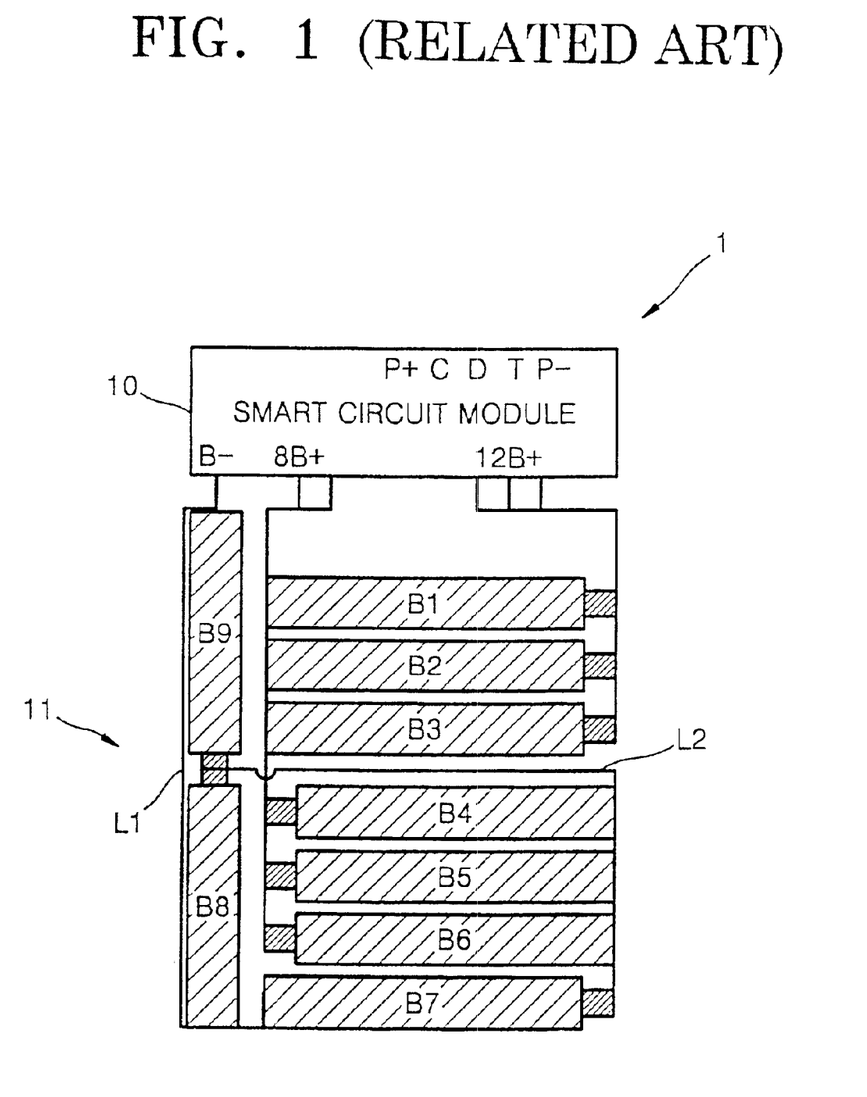
FIG. 1 is a view showing the wiring structure of a battery pack of a conventional smart battery.
Figure 2:
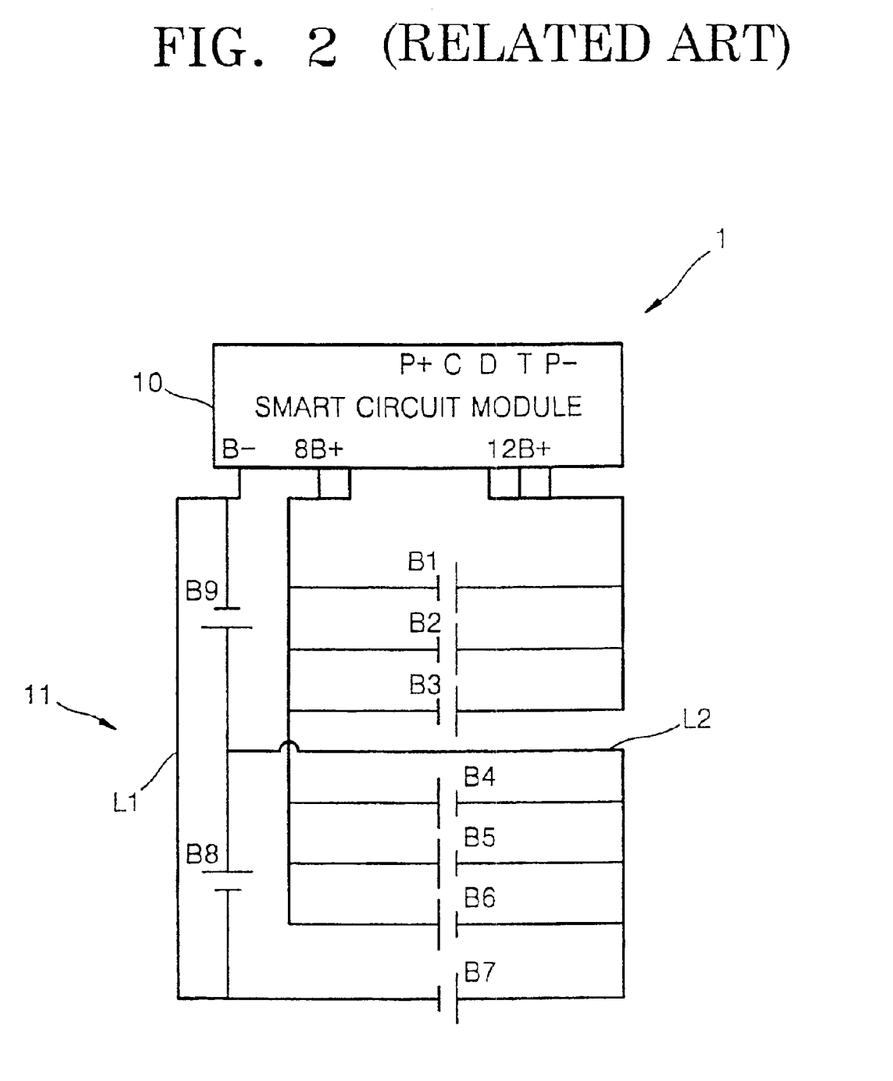
FIG. 2 is a view showing an equivalent circuit corresponding to the wiring structure of FIG. 1.
Figure 3:
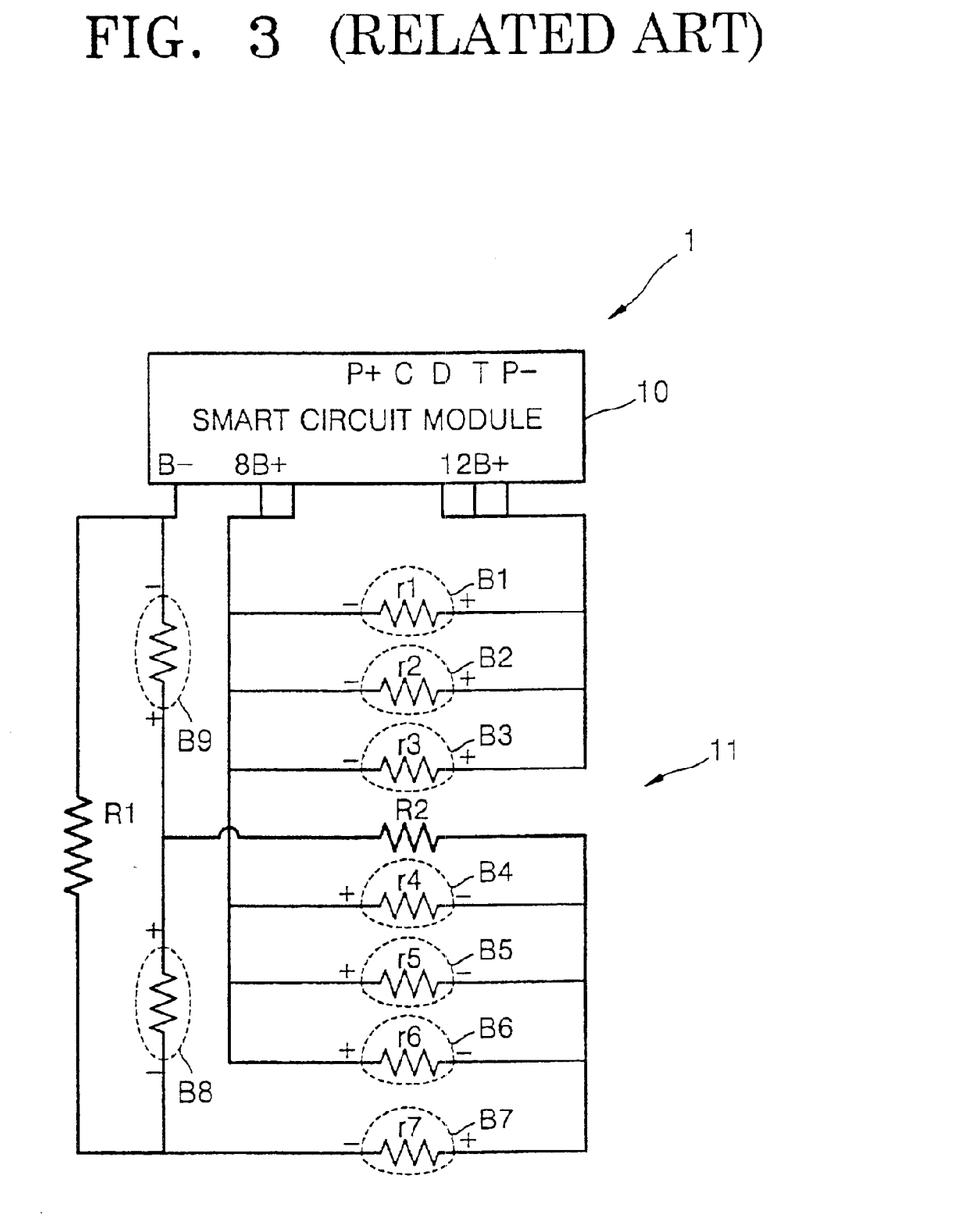
FIG. 3 is a view showing a resistance equivalent circuit corresponding to the wiring circuit of FIG. 1.

FIG. 1 shows the wiring structure of a battery pack 11 of a conventional smart battery 1. FIG. 2 shows an equivalent circuit corresponding to the wiring structure of FIG. 1. FIG. 3 shows a resistance equivalent circuit corresponding to the wiring structure of FIG. 1.

Referring to FIGS. 1 through 3, the conventional smart battery 1 includes a smart circuit module 10 and the battery pack 11. A negative pole output terminal of the battery pack 11 is connected to a negative pole terminal (B−) of the smart battery 1. Also, an 8 V (volts) positive pole output terminal of the battery pack 11 is connected to a 8 V positive pole terminal (8B+) of the smart battery 1. A 12 V positive pole output terminal of the battery pack 11 is connected to a 12 V positive pole terminal 12B+ of the smart battery 1. As output terminals of the smart circuit module 10, there are a positive pole output terminal (P+) connected to a 12 V positive pole terminal (12B+), a negative pole output terminal (P−) connected to a negative pole terminal (B−), a clock terminal C, a data terminal D, and a temperature terminal T.

In the battery pack 11, the first through seventh secondary batteries B1–B7 are sequentially stacked from the position of output terminals of a pack connected to power input terminals B−, 8B+, and 12B+ of the smart circuit module 10. Positive pole terminals of the first through third secondary batteries B1, B2, and B3 are connected in common by a conductive body to the 12 V positive pole terminal 12B+ of the smart battery 1. Here, since the common connection portion of the positive pole terminals of the first through third secondary batteries B1, B2, and B3 occupy most of the conductive body, internal resistance of the conductive body is not so high to need consideration in relation with the current paths. Also, negative pole terminals of the first through third secondary batteries B1, B2, and B3 and positive pole terminals of the fourth through sixth secondary batteries B4, B5, and B6 are connected in common by a conductive body to the 8 V positive pole terminal 8B+ of the smart circuit module 10. Here, since the common connection portion of the negative pole terminals of the first through third secondary batteries B1, B2, and B3 and the positive pole terminals of the fourth through sixth secondary batteries B4, B5, and B6 occupy most of the conductive body, internal resistance of the conductive body is not so high to need consideration in relation with the current paths.

The ninth and eighth secondary batteries B9 and B8 are sequentially disposed from the positions of the output terminals of the pack in a row in a direction perpendicular to a direction in which the first through seventh secondary batteries B1–B7 are arranged. Positive pole terminals of the ninth and eighth secondary batteries B9 and B8, negative pole terminals of the fourth through sixth secondary batteries B4, B5, and B6, and a positive pole terminal of the seventh secondary battery B7 are connected in common by a second conductive body L2. Here, since the common connection portion of the negative pole terminals of the fourth through sixth secondary batteries B4, B5, and B6, and the positive pole terminal of the seventh secondary battery B7 occupy most of a vertical portion of the second conductive body L2, internal resistance of the vertical portion is not so high to need consideration in relation with the current paths. However, because a horizontal portion of the second conductive body L2 is not so, internal resistance of the horizontal portion has a great effect in relation with the current paths. Meanwhile, negative pole terminals of the seventh, eighth, ninth secondary batteries B7, B8, and B9 are connected in common by a first conductive body L1. Here, most of the first conductive body L1 which is the longest than the other conductive bodies is disposed between a connection portion of the negative pole terminal of the ninth secondary battery B9 and a connection portion of the negative pole terminal of the eighth secondary battery B8. Accordingly, internal resistance of the first conductive body L1 has the greatest effect in relation with the current paths.

Referring to FIG. 3, the current path through which current flows from the 12 V positive pole terminal 12B+ of the smart circuit module 10 to the negative pole terminal B− can be branched to nine ways listed in Table 1.

TABLE 1

| Secondary battery | Current path |
| --- | --- |
| B1 | 12B+ → B1 → (B4, B5, and B6) → R2 → B9 → B− |
| B2 | 12B+ → B2 → (B4, B5, and B6) → R2 → B9 → B− |
| B3 | 12B+ → B3 → (B4, B5, and B6) → R2 → B9 → B− |
| B4 | 12B+ → (B1, B2, and B3) → B4 → R2 → B9 → B− |
| B5 | 12B+ → (B1, B2, and B3) → B5 → R2 → B9 → B− |
| B6 | 12B+ → (B1, B2, and B3) → B6 → R2 → B9 → B− |
| B7 | 12B+ → (B1, B2, and B3) → (B4, B5, and B6) → B7 → R1 → B− |
| B8 | 12B+ → (B1, B2, and B3) → (B4, B5, and B6) → R2 → B8 → R1 → B− |
| B9 | 12B+ → (B1, B2, and B3) → (B4, B5, and B6) → R2 → B9 → B− |

In Table 1, the internal resistance of the first conductive body L2 is greater than that of the second conductive body L2. Thus, referring to Table 1, the resistance of the current path of the eighth secondary battery B8 is the highest, the resistance of the current path of the seventh secondary battery B7 is the second highest, the resistance of the current path of the ninth secondary battery B9 is the third highest, and the resistance of the current path of each of the remaining first through sixth secondary batteries B1–B6 is the lowest.

Accordingly, in the conventional battery pack 11 according to a simple internal wiring, charging/discharging performance of the eighth secondary battery B8 is the worst and the life span thereof is the shortest. Therefore, performance of the smart battery 1 including the battery pack 11 is low and the life span thereof is reduced.

SUMMARY OF THE INVENTION

To solve the above-described and other problems, it is an object of the present invention to provide a battery pack in which the current characteristics of internal batteries are equalized so that the charging/discharging performance and life span thereof is improved.

It is another object to have a battery pack that is easy and inexpensive to manufacture.

To achieve the above and other objects, there is provided a battery pack in which first through $n^{th}$ secondary batteries, where n is an integer which is 2 or more, are sequentially stacked from the pack output terminals, $(n+2)^{th}$ and $(n+1)^{th}$ secondary batteries are disposed from the positions of pack output terminals in a row in a direction perpendicular to a direction in which the first through $n^{th}$ secondary batteries are arranged, first polarity terminals of the $(n+2)^{th}$ and $(n+1)^{th}$ secondary batteries are connected with each other, and a pack output terminal having a second polarity opposite to the first polarity and the second polarity terminals of the $n^{th}$, the $(n+1)^{th}$, and the $(n+2)^{th}$ are connected in common by a conductive body, wherein the second polarity terminals of the $(n+2)^{th}$ and $(n+1)^{th}$ secondary batteries are connected with each other by a first conductive body, a second conductive body is connected to the pack output terminals having the second polarity are connected at a first branch point of the first conductive body, and the first branch point of the first conductive body is set to minimize a difference between resistance values of current paths of the $(n+2)^{th}$ and $(n+1)^{th}$ secondary batteries between the pack output terminals having the first and second polarities.

According to the battery pack of the present invention, the difference between the resistance values of the current paths of the secondary batteries between the pack output terminals can be minimized. Accordingly, as the current characteristics of the secondary batteries are equalized, the charging/discharging (charging or discharging or both charging and discharging) performance and the life span thereof can be improved.

It is preferred in the present invention that a third conductive body is connected to the second polarity terminal of the $n^{th}$ secondary battery at a second branch point of the first conductive body, and the second branch point of the first conductive body is set to minimize a difference between resistance values of current paths of the $(n+1)^{th}$ and $n^{th}$ secondary batteries between the pack output terminals having the first and second polarities. Thus, the difference between the resistance values of the current paths of the secondary batteries between the pack output terminals having the first and second polarities can be further minimized.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 4:
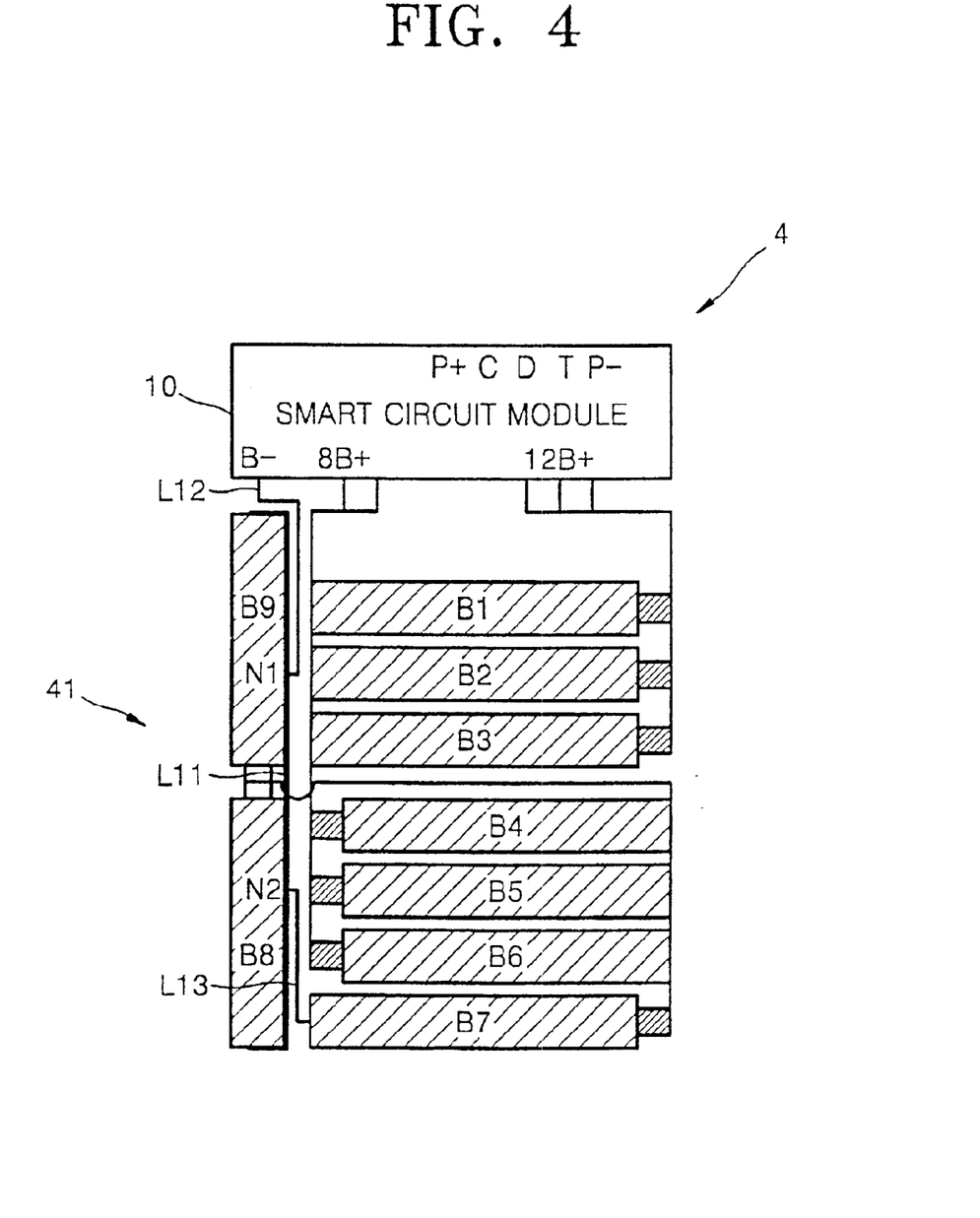
FIG. 4 is a view showing the wiring structure of a battery pack of a smart battery according to a preferred embodiment of the present invention.
Figure 5:
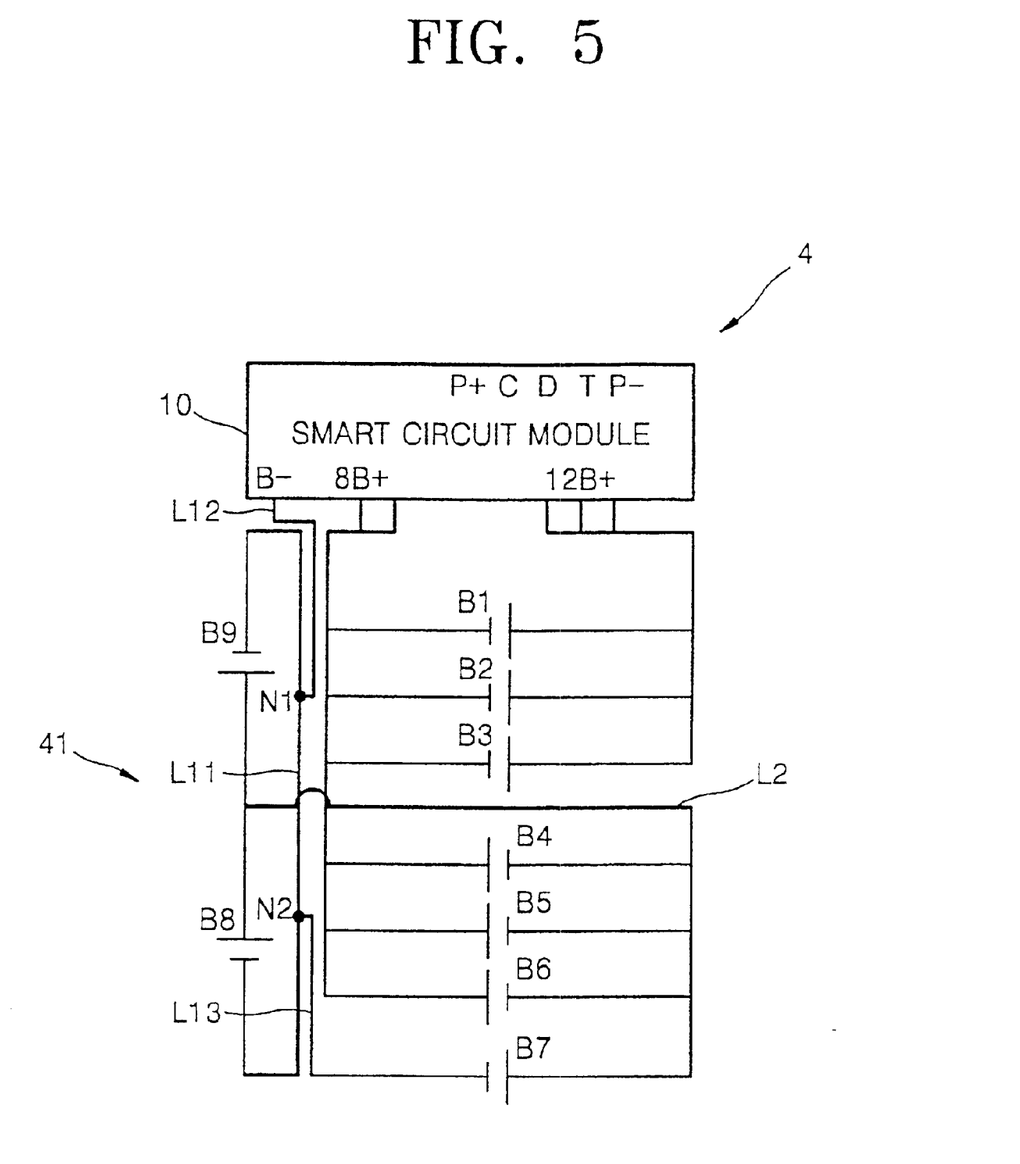
FIG. 5 is a view showing an equivalent circuit corresponding to the wiring structure of FIG. 4.
Figure 6:
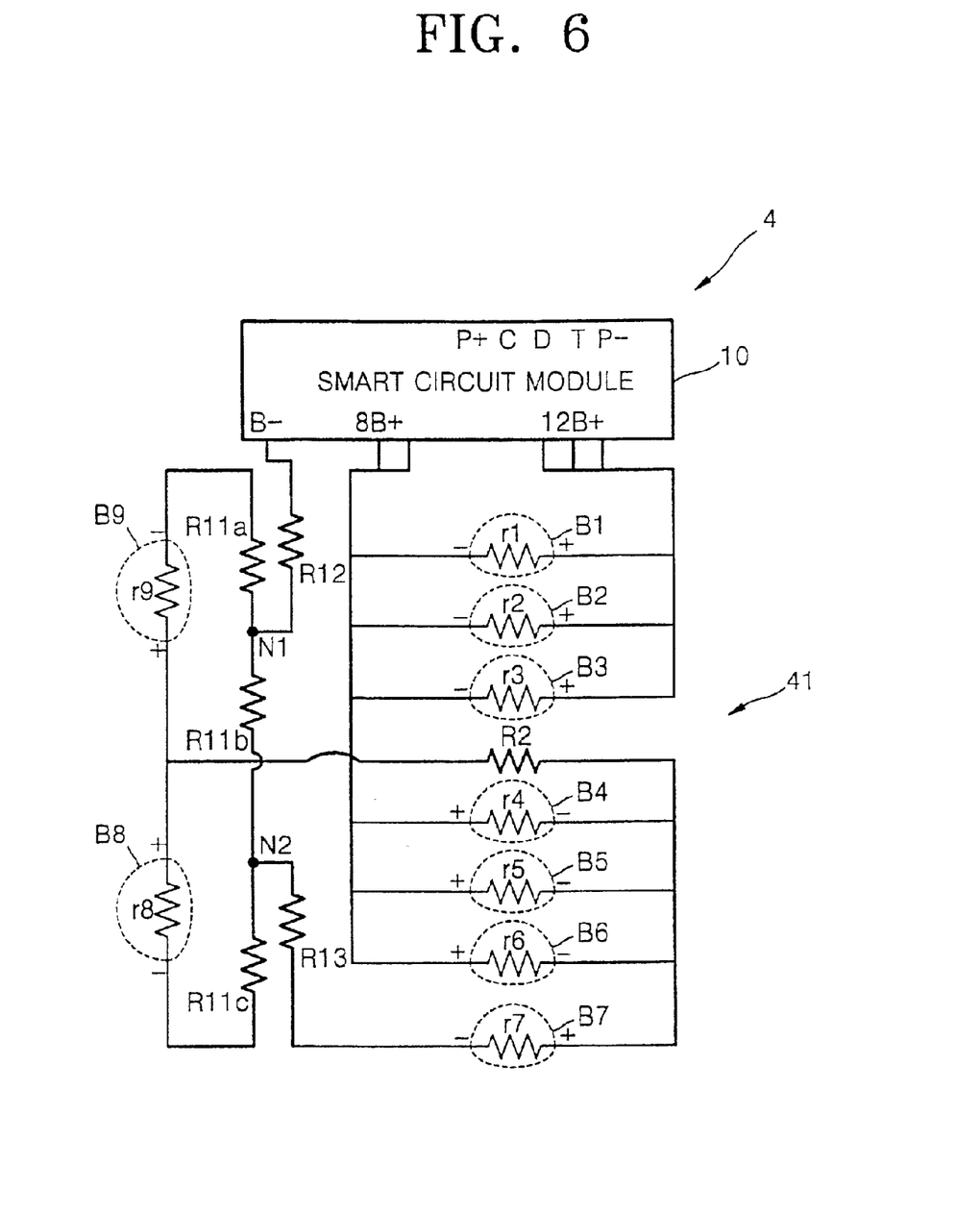
FIG. 6 is a view showing a resistance equivalent circuit corresponding to the wiring circuit of FIG. 4.

Referring to FIGS. 4, 5, and 6, in a battery pack 41 according to a preferred embodiment of the present invention, first through $n^{th}$ (here, for example, "n" is 7) secondary batteries are sequentially stacked from the positions of pack output terminals connected to power input terminals B−, 8B+, and 12B+ of the smart circuit module 10. Also, $(n+2)^{th}$ (the ninth) and $(n+1)^{th}$ (the eighth) secondary batteries B9 and B8 are sequentially disposed in a row from the positions of pack output terminals in a direction perpendicular to a direction in which the first through $n^{th}$ (here, "n" is 7) secondary batteries are arranged. First polarity terminals (positive terminals) of the $(n+2)^{th}$ (the ninth) and $(n+1)^{th}$ (the eighth) secondary batteries B9 and B8 are connected with each other. A pack output terminal having the second polarity (negative polarity) opposite to the first polarity (positive polarity), the second polarity (negative polarity) terminals of the $n^{th}$ (the seventh), the $(n+1)^{th}$ (the eighth), and the $(n+2)^{th}$ (the ninth) (B7, B8, and B9) are connected in common by conductive bodies L11, L12, and L13. Here, the second polarity (negative polarity) terminals of the $(n+2)^{th}$ (the ninth) B9 and the $(n+1)^{th}$ (the eighth) B8 are connected to each other by the first conductive body L11. The second conductive body L12 branched from a first branch point N1 of the first conductive body L11 to a pack output terminal having the second polarity (negative polarity). The first branch point N1 of the first conductive body L11 is set to minimize a difference between resistance values of current paths of the $(n+2)^{th}$ (the ninth) B9 and the $(n+1)^{th}$ (the eighth) B8 between the pack output terminals having the first and second polarities (that is, between an input terminal B− and an input terminal 8B+, or between the input terminal B− and the input terminal 12B+).

According to the battery pack 41 of the present invention, the difference between resistance values of current paths of the secondary batteries B1–B9 of the pack output terminals (that is, between an input terminal B− and an input terminal 8B+, or between the input terminal B− and the input terminal 12B+) can be minimized. Accordingly, as the current characteristics of the secondary batteries B1–B9 are equalized, the charging/discharging (charging and discharging) performance and the life span thereof can be improved.

In the meantime, the third conductive body L13 is connected to the second polarity (negative polarity) terminal of the $n^{th}$ (the seventh) battery having the second polarity (negative polarity) at the second branch point N2 of the first conductive body L11. Here, the second branch point N2 of the first conductive body L11 is set to minimize a difference between resistance values of current paths of the $(n+1)^{th}$ (the eighth) B8 and the $n^{th}$ (the seventh) B7 between the pack output terminals having the first and second polarities (that is, between the input terminal B− and the input terminal 8B+, or between the input terminal B− and the input terminal 12B+). Accordingly, the difference between resistance values of current paths of the secondary batteries B1–B9 between the pack output terminals having the first and second polarities can be further minimized.

The battery pack 41 according to the present invention will now be described in detail with reference to FIGS. 4 through 6.

A smart battery 4 including the battery pack 41 according to the present invention includes a smart circuit module 10 and the battery pack 41. A negative pole output terminal from the battery pack 41 is connected to a negative pole terminal B− of the smart battery 4. Also, an 8 V positive pole output terminal of the battery pack 41 is connected to the 8 V positive pole terminal 8B+ of the smart battery 4. A 12 V positive pole output terminal of the battery pack 41 is connected to the 12 V positive pole terminal 12B+ of the smart battery 4. The output terminals of the smart circuit module 10 includes a positive output terminal P+ connected to the 12 V positive terminal 12B+, a negative output terminal P− connected to the negative pole terminal B−, a clock terminal C, a data terminal D, and a temperature terminal T.

In the battery pack 41 according to the present invention, the first through seventh secondary batteries B1–B7 are sequentially stacked from the positions of the pack output terminal connected to the power input terminals B−, 8B+, and 12B+ of the smart circuit module 10. The positive pole terminals of the first through third secondary batteries B1, B2, and B3 are connected in common by a conductive body to the 12 V positive pole terminal 12B+ of the smart circuit module 10. Here, since the common connection portion of the positive pole terminals of the first through third secondary batteries B1, B2, and B3 occupy most of the conductive body, internal resistance of the conductive body is not so high to need consideration in relation with the current paths. Also, the negative pole terminals of the first through third secondary batteries B1, B2, and B3 and the positive pole terminals of the fourth through sixth secondary batteries B4, B5, and B6 are connected in common by a conductive body to the 8 V positive pole terminal 8B+ of the smart circuit module 10. Here, since the common connection portion of the negative pole terminals of the first through third secondary batteries B1, B2, and B3 and the positive pole terminals of the fourth through sixth secondary batteries B4, B5, and B6 occupy most of the conductive body, internal resistance of the conductive body is not so high to need consideration in relation with the current paths.

The ninth and eighth secondary batteries B9 and B8 are sequentially disposed in a row from the positions of the pack output terminals in a direction perpendicular to a direction in which the first through seventh secondary batteries B1–B7 are arranged. The positive pole terminals of the ninth and eighth secondary batteries B9 and B8, the negative pole terminals of the fourth through sixth secondary batteries B4, B5, and B6, and the positive pole terminal of the seventh secondary battery B7 are connected in common by the rectangular second conductive body L2. Here, since the common connection portion of the negative pole terminals of the fourth through sixth secondary batteries B4, B5, and B6 and the positive pole terminals of the seventh secondary battery B7 occupy most of a vertical portion of the rectangular second conductive body L2, internal resistance of the vertical portion is not so high to need consideration in relation with the current paths. However, since a horizontal portion of the rectangular second conductive body L 12 is not so, internal resistance of the horizontal portion has a great effect in relation with the current paths.

The negative pole terminals of the ninth and eighth secondary batteries B9 and B8 are connected with each other by the first conductive body L11. The second conductive body L12 is connected to the negative pole terminal B− of the smart circuit module 10 from the first branch point N1 of the first conductive body L11. Here, the first branch point N1 is set to minimize a difference between resistance values of the current paths of the ninth and eighth batteries B9 and B8 between the 12 V positive pole terminal 12B+ and the negative pole terminals B− of the smart circuit module 10. The third conductive body L13 is connected to the negative pole terminal of the seventh secondary battery B7 at the second branch point N2 of the first conductive body L11. Here, the second point N2 is set to minimize a difference between resistance values of the current paths of the eighth and seventh batteries B8 and B7 between the 12 V positive pole terminal 12B+ and the negative pole terminals B− of the smart circuit module 10.

Referring to FIG. 6, the current path through which current flows from the 12 V positive pole terminal 12B+ of the smart circuit module 10 to the negative pole terminal B− is divided into nine ways with respect to the second batteries B1–B9, as shown in Table 2.

TABLE 2

| Secondary battery | Current path |
|---|---|
| B1 | 12B+ → B1 → (B4, B5, and B6) → R2 → B9 → R11a → R12 → B− |
| B2 | 12B+ → B2 → (B4, B5, and B6) → R2 → B9 → R11a → R12 → B− |
| B3 | 12B+ → B3 → (B4, B5, and B6) → R2 → B9 → R11a → R12 → B− |
| B4 | 12B+ → (B1, B2, and B3) → B4 → R2 → B9 → R11a → R12 → B− |
| B5 | 12B+ → (B1, B2, and B3) → B5 → R2 → B9 → R11a → R12 → B− |
| B6 | 12B+ → (B1, B2, and B3) → B6 → R2 → B9 → R11a → R12 → B− |
| B7 | 12B+ → (B1, B2, and B3) → (B4, B5, and B6) → B7 → R13 → R11b → R12 → B− |
| B8 | 12B+ → (B1, B2, and B3) → (B4, B5, and B6) → R2 → B8 → R11c → R11b → R12 → B− |
| B9 | 12B+ → (B1, B2, and B3) → (B4, B5, and B6) → R2 → B9 → R11a → R12 → B− |

Referring to Table 2, the second conductive body L12 is connected to the negative terminal B− of the smart circuit module 10 at the first branch point N1 of the first conductive body L11. Thus, internal resistances R11a and R12 of the conductive body is added on each of the current paths of the first through sixth secondary batteries B1–B6 and the ninth secondary battery B9. That is, a resistance value of each current path of the first through sixth secondary batteries B1–B6 and the ninth secondary battery B9 increases remarkably. However, a resistance value of a current path of the eighth secondary battery B8 increases very slightly. Accordingly, a difference between the resistance value of each current path of the first through sixth secondary batteries B1–B6 and the ninth secondary battery B9 and a resistance value of the current path of the eighth secondary battery B8, decreases. The difference between the resistance values can be minimized by adjusting the position of the first branch point N1.

As the third conductive body L13 is connected to the negative pole terminal of the seventh secondary battery B7 at the second branch point N2 of the first conductive body L11, a resistance value of the current path of the seventh secondary battery B7 increases considerably. However, a resistance value of the current path of the eighth secondary battery B8 increases slightly. Accordingly, the difference between a resistance value of the current path of the seventh secondary battery B7 and a resistance value of the current path of the eighth secondary battery B8, decreases. The difference between the resistance values can be minimized by adjusting the position of the second branch point N2.

As described above, in the battery pack according to the present invention, the difference between the resistance values of the current paths of the secondary batteries between the pack output terminals can be minimized. Accordingly, as the current characteristics of the secondary batteries are equalized, the charging/discharging (charging and discharging) performance and the life span thereof can be improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A battery pack, comprising:
    a first through $n^{th}$ secondary batteries, where n is an integer of at least 2, being sequentially stacked from the pack output terminals; and
    $(n+2)^{th}$ and $(n+1)^{th}$ secondary batteries being disposed from the positions of pack output terminals in a row in a direction perpendicular to a direction in which said first through $n^{th}$ secondary batteries are arranged, first polarity terminals of said $(n+2)^{th}$ and $(n+1)^{th}$ secondary batteries being connected to each other, and a pack output terminal having a second polarity opposite to the first polarity and the second polarity terminals of said $n^{th}$, the $(n+1)^{th}$, and the $(n+2)^{th}$ secondary batteries being connected in common by a conductive body, said conductive body comprising:
        a first conductive body connecting the second polarity terminals of said $(n+2)^{th}$ and $(n+1)^{th}$ secondary batteries to each other; and
        a second conductive body connecting to the pack output terminals including the second polarity at a first branch point of said first conductive body, and said first branch point of said first conductive body being set to minimize a difference between resistance values of current paths of the $(n+2)^{th}$ and $(n+1)^{th}$ secondary batteries between the pack output terminals including the first and second polarities.

2. The battery pack as claimed in claim 1, further comprising a third conductive body being connected to the second polarity terminal of the $n^{th}$ secondary battery at a second branch point of the first conductive body, and said second branch point of the first conductive body being set to minimize a difference between resistance values of current paths of the $(n+1)^{th}$ and $n^{th}$ secondary batteries between the pack output terminals including the first and second polarities.

3. The battery pack as claimed in claim 2, said second branch point being set by adjusting the position of said second branch point on said first conductive body.

4. The battery pack as claimed in claim 1, said first branch point being set by adjusting the position of said first branch point on said first conductive body.

5. The battery pack as claimed in claim 1, said plurality of conductive bodies further comprising a third conductive body being connected to the second polarity terminal of the $n^{th}$ secondary battery at a second branch point of the first conductive body.

6. The battery pack as claimed in claim 1, further comprising of a second branch point of the first conductive body being set to minimize a difference between resistance values of current paths of the $(n+1)^{th}$ and $n^{th}$ secondary batteries between the first and second polarities of the pack output terminals.

7. A battery pack, comprising:
    a first through $n^{th}$ secondary batteries, where n is an integer of at least 2, being sequentially stacked from at least one of the plurality of pack output terminals; and
    $(n+2)^{th}$ and $(n+1)^{th}$ secondary batteries being disposed in a row from the positions of pack output terminals, said $(n+2)^{th}$ and $(n+1)^{th}$ secondary batteries being connected with each other, and one of the pack output terminals having a second polarity opposite to the first polarity and the second polarity terminals of the $n^{th}$, the $(n+1)^{th}$, and the $(n+2)^{th}$ being connected in common by a plurality of conductive bodies, said plurality of conductive bodies comprising:
        a first conductive body connecting the second polarity terminals of the $(n+2)^{th}$ and $(n+1)^{th}$ secondary batteries to each other; and
        a second conductive body connecting to the second polarity of the pack output terminals at a first branch point of said first conductive body.

8. The battery pack as claimed in claim 7, said first branch point of said first conductive body being set to minimize a difference between resistance values of current paths of the $(n+2)^{th}$ and $(n+1)^{th}$ secondary batteries between the first and second polarities of the pack output terminals.

9. The battery pack as claimed in claim 8, said plurality of conductive bodies further comprising a third conductive body being connected to the second polarity terminal of the $n^{th}$ secondary battery at a second branch point of the first conductive body.

10. The battery pack as claimed in claim 9, said second branch point of the first conductive body being set to minimize a difference between resistance values of current paths of the $(n+1)^{th}$ and $n^{th}$ secondary batteries between the first and second polarities of the pack output terminals.

11. The battery pack as claimed in claim 9, said second branch point being set by adjusting the position of said second branch point on said first conductive body.

12. The battery pack as claimed in claim 7, said first branch point being set by adjusting the position of said first branch point on said first conductive body.

13. A battery pack, comprising:
first and second secondary batteries being stacked from a plurality of pack output terminals; and
third and fourth secondary batteries being disposed from the positions of pack output terminals in a row arranged separately from said first and second secondary batteries, first polarity terminals of said third and fourth secondary batteries being connected to each other, and one of said plurality of pack output terminals having a second polarity opposite to the first polarity and the second polarity terminals of said second, third, and fourth secondary batteries being connected in common by a plurality of conductive bodies, said plurality of conductive bodies comprising:
a first conductive body connecting the second polarity terminals of said third and fourth secondary batteries to each other; and
a second conductive body connecting to the second polarity of one of said plurality of pack output terminals at a first branch point on said first conductive body, and said first branch point of said first conductive body being set to minimize a difference between resistance values of current paths of the fourth and third secondary batteries between the first and second polarities of said plurality of pack output terminals.

14. The battery pack as claimed in claim 13, said plurality of conductive bodies further comprising a third conductive body connecting the second polarity terminal of the second secondary battery at a second branch point of said first conductive body, and said second branch point of said first conductive body being set to minimize a difference between resistance values of current paths of the second and third secondary batteries between the first and second polarities of said plurality of pack output terminals.

15. The battery pack as claimed in claim 13, said plurality of conductive bodies further comprising a third conductive body connecting the second polarity terminal of the second secondary battery at a second branch point of said first conductive body.

16. A battery pack, comprising:
a first and second secondary batteries, being sequentially stacked from the pack output terminals; and
a third and fourth secondary batteries being disposed from the positions of pack output terminals in a row in a direction perpendicular to a direction in which said first and second secondary batteries are arranged, first polarity terminals of said third and fourth secondary batteries being connected to each other, and a pack output terminal having a second polarity opposite to the first polarity and the second polarity terminals of said second, said third, and said fourth secondary batteries being connected in common by a conductive body, said conductive body comprising:
a first conductive body connecting the second polarity terminals of said fourth and third secondary batteries to each other; and
a second conductive body connecting to the pack output terminals including the second polarity at a first branch point of said first conductive body.

17. The battery pack as claimed in claim 16, with said first branch point of said first conductive body being set to minimize a difference between resistance values of current paths of the fourth and third secondary batteries between the pack output terminals including the first and second polarities.

18. The battery pack as claimed in claim 16, said plurality of conductive bodies further comprising a third conductive body being connected to the second polarity terminal of the second secondary battery at a second branch point of said first conductive body.

19. The battery pack as claimed in claim 17, with said second branch point of said first conductive body being set to minimize a difference between resistance values of current paths of said third and second secondary batteries between the first and second polarities of the pack output terminals.

20. A battery pack, comprising:
a plurality of first secondary batteries, being stacked from the pack output terminals; and
second and third secondary batteries being disposed from the positions of pack output terminals in a row, first polarity terminals of said second and third secondary batteries being connected to each other, and a pack output terminal having a second polarity opposite to the first polarity and the second polarity terminals of one of said first secondary batteries, said second, and said third secondary batteries being connected in common by a conductive body, said conductive body comprising:
a first conductive body connecting the second polarity terminals of said third and second secondary batteries to each other; and
a second conductive body connecting to the pack output terminals including the second polarity at a first branch point of said first conductive body.

21. The battery pack as claimed in claim 20, with said first branch point of said first conductive body being set to minimize a difference between resistance values of current paths of said second and third secondary batteries between the pack output terminals including the first and second polarities.

22. The battery pack as claimed in claim 21, with said plurality of first secondary batteries being stacked sequentially from the pack output terminals.

23. The battery pack as claimed in claim 22, said plurality of conductive bodies further comprising a third conductive body being connected to the second polarity terminal of one of said first secondary batteries at a second branch point of said first conductive body.

24. The battery pack as claimed in claim 23, with said second branch point of said first conductive body being set to minimize a difference between resistance values of current paths of said second and the one of first secondary batteries between the first and second polarities of the pack output terminals.

25. The battery pack as claimed in claim 22, with said second and third secondary batteries being disposed from the positions of pack output terminals in a row in a direction perpendicular to a direction in which said plurality of first secondary batteries are arranged.

* * * * *